(12) United States Patent
Debnath et al.

(10) Patent No.: US 12,547,922 B2
(45) Date of Patent: Feb. 10, 2026

(54) BENCHMARK-DRIVEN AUTOMATION FOR TUNING QUANTUM COMPUTERS

(71) Applicant: IonQ, Inc., College Park, MD (US)

(72) Inventors: Shantanu Debnath, Lanham, MD (US); Aleksey Blinov, Evanston, IL (US); Coleman Collins, Chicago, IL (US); Kenneth Wright, Berwyn Heights, MD (US); Neal C. Pisenti, Baltimore, MD (US); Kristin M. Beck, Livermore, CA (US); Jwo-Sy Chen, Laurel, MD (US); Jason Hieu Van Nguyen, Hyattsville, MD (US); Kevin Antony Landsman, Rockville, MD (US); Hermann Uys, Annapolis, MD (US); Matthew Keesan, Keuka Park, NY (US)

(73) Assignee: IonQ, Inc., College Park, MD (US)

( * ) Notice: Subject to any disclaimer, the term of this patent is extended or adjusted under 35 U.S.C. 154(b) by 785 days.

(21) Appl. No.: 18/047,874

(22) Filed: Oct. 19, 2022

(65) Prior Publication Data

US 2023/0120170 A1 Apr. 20, 2023

Related U.S. Application Data

(60) Provisional application No. 63/257,900, filed on Oct. 20, 2021.

(51) Int. Cl.
*G06N 10/60* (2022.01)
*G06N 10/20* (2022.01)

(52) U.S. Cl.
CPC .............. *G06N 10/60* (2022.01); *G06N 10/20* (2022.01)

(58) Field of Classification Search
CPC ........ G06N 10/00; G06N 10/20; G06N 10/40; G06N 10/60; G06N 10/70; G06N 10/80;
(Continued)

(56) References Cited

U.S. PATENT DOCUMENTS 7,583,710 B2 * 9/2009 Dantus ............... G01B 9/02014
250/281
9,940,212 B2 * 4/2018 Kelly .................. G06F 11/2247
(Continued)

FOREIGN PATENT DOCUMENTS

CA 3140091 A1 * 12/2020 ............. G06N 10/60
CA 3151055 A1 * 4/2021 ............... G06N 5/01
(Continued)

*Primary Examiner* — Steven P Sax
(74) *Attorney, Agent, or Firm* — ARENTFOX SCHIFF LLP

(57) ABSTRACT

Systems and methods for use in the implementation and/or operation of quantum information processing (QIP) systems or quantum computers, and more particularly, to benchmark-driven automation for tuning quantum computers are described. A method includes identifying a set of quantum gates and a number of experimental shots to perform a benchmark algorithm for active stabilization of one or more observables of the set of quantum gates and executing the benchmarking algorithm based on the set of quantum gates and the number of experimental shots. Moreover, in response to the benchmarking algorithm being successful, executing an algorithm on the quantum computer, and in response to the benchmarking algorithm being unsuccessful, iterating the benchmarking algorithm by adjusting the set of quantum gates until the benchmarking algorithm is successful or a preset number of iterations is reached.

18 Claims, 10 Drawing Sheets

(58) Field of Classification Search
CPC ....... G06N 5/01; G06F 11/3442; G06F 30/20; G06F 8/41; G06F 11/2247; G01B 9/02014; H04L 9/0858; G21K 1/003; B82Y 20/00
See application file for complete search history.

(56) References Cited

U.S. PATENT DOCUMENTS

| | | | | |
|---|---|---|---|---|
| 10,469,087 | B1* | 11/2019 | Granade | G06N 10/70 |
| 11,113,084 | B2* | 9/2021 | Kliuchnikov | G06N 10/20 |
| 11,194,642 | B2* | 12/2021 | Javadiabhari | G06N 10/80 |
| 11,281,524 | B1* | 3/2022 | Egger | G06N 10/20 |
| 11,481,660 | B2* | 10/2022 | Nam | G21K 1/003 |
| 11,562,284 | B1* | 1/2023 | Ryan | G06N 10/00 |
| 11,687,818 | B2* | 6/2023 | Kanazawa | G06N 10/00 375/259 |
| 11,875,222 | B1* | 1/2024 | Reagor | G06N 10/20 |
| 12,165,005 | B1* | 12/2024 | Kubica | G06F 11/3442 |
| 2015/0339417 | A1* | 11/2015 | Garcia-Ramirez | G06F 30/20 703/2 |
| 2019/0080254 | A1* | 3/2019 | Haah | H04L 9/0858 |
| 2021/0334079 | A1* | 10/2021 | Gambetta | G06F 8/41 |
| 2023/0237361 | A1* | 7/2023 | Cowtan | G06N 5/01 706/62 |
| 2024/0211786 | A1* | 6/2024 | Zimmerman | G06N 10/70 |

FOREIGN PATENT DOCUMENTS

| | | | | |
|---|---|---|---|---|
| CA | 3121105 | A1 * | 6/2022 | G06N 10/20 |
| CN | 114026576 | A * | 2/2022 | G06N 10/70 |
| JP | 2022524586 | A * | 5/2022 | G06N 10/80 |
| JP | 2023521223 | A * | 5/2023 | G06N 10/60 |
| WO | WO-2020010208 | A1 * | 1/2020 | G06N 10/20 |
| WO | WO-2020205037 | A1 * | 10/2020 | G06N 10/70 |
| WO | WO-2020263299 | A1 * | 12/2020 | G06N 10/70 |
| WO | WO-2021011765 | A1 * | 1/2021 | B82Y 20/00 |
| WO | WO-2021211470 | A1 * | 10/2021 | G06N 10/20 |

* cited by examiner

BENCHMARK-DRIVEN AUTOMATION FOR TUNING QUANTUM COMPUTERS

PRIORITY

This application claims priority to and the benefit from U.S. Provisional Application No. 63/257,900, filed on Oct. 20, 2021, and titled "Benchmark-Driven Automation for Tuning Quantum Computers," the contents of which are incorporated herein by reference in their entirety.

BACKGROUND

Aspects of the present disclosure relate generally to systems and methods for use in the implementation, operation, and/or use of quantum information processing (QIP) systems.

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, control, and/or functionality of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of benchmark-driven automation techniques for tuning or calibrating QIP systems using an active stabilization approach. The terms QIP system and quantum computers may be used interchangeably throughout this disclosure to refers to systems capable of performing quantum-based computations, simulations, and/or other operations.

Aspects of a method for tuning a quantum computer are described that include identifying a set of quantum gates and a number of experimental shots to perform a benchmark algorithm for active stabilization of one or more observables of the set of quantum gates. The method further includes executing the benchmarking algorithm based on the set of quantum gates and the number of experimental shots. The method further includes, in response to the benchmarking algorithm being successful, executing an algorithm on the quantum computer, and in response to the benchmarking algorithm being unsuccessful, iterating the benchmarking algorithm by adjusting the set of quantum gates until the benchmarking algorithm is successful or a preset number of iterations is reached.

Aspects of a quantum computer are described that include a trap configured to hold multiple ions to implement quantum gates, a controller, and an algorithms component. The controller may be configured to identify a set of quantum gates and a number of experimental shots to perform a benchmark algorithm for active stabilization of one or more observables of the set of quanta gates and execute the benchmarking algorithm based on the set of quantum gates and the number of experimental shots. Moreover, the algorithms component may be configured to, in response to the benchmarking algorithm being successful, execute an algorithm, and the controller may be further configured to, in response to the benchmarking algorithm being unsuccessful, iterate the benchmarking algorithm by adjusting the set of quantum gates until the benchmarking algorithm is successful or a preset number of iterations is reached.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
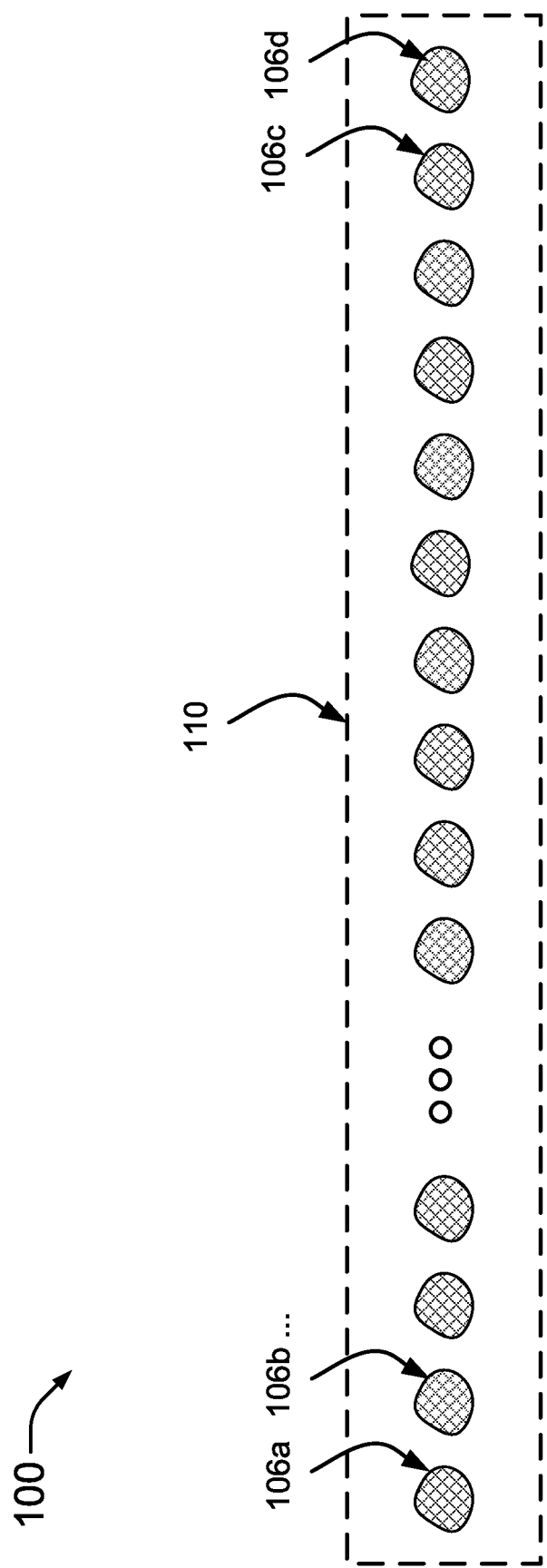
FIG. 1 illustrates a view of atomic ions a linear crystal or chain in accordance with aspects of this disclosure.

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well known components.

Quantum computers can be fragile devices that require very low levels of noise coupling into the quantum processor in order to preserve the performance of quantum gates ensuring the highest possible algorithm fidelity. A quantum processor or quantum processing unit (or simply processor) may refer to the portion of the quantum computer in which quantum-based computations, simulations, and/or other operations are physically performed. Noise in various forms such as mechanical, thermal, electrical, etc., can couple into the system and can cause drifts in the system properties leading to a degradation of gate fidelity. Drifts that occur on a timescale much larger than the typical duration of executing algorithms, can be measured periodically and mitigated by tuning parameters of the system that cancels such drift.

The cancellation of systematic drifts can be thought of as a system stabilization procedure, which can either be active or passive. A passive stabilization requires designing the system such that the detrimental effects of noise on gates, are suppressed by virtue of the noise resilience of the design itself. However, all sources of noise cannot be mitigated in this way or mitigated at the level necessary for running high performance quantum gates. This is where active stabilization becomes instrumental in suppressing residual noise and drifts in the system.

A specific type of active stabilization is described herein in which the gate performance is probed by executing fast enquiries to a quantum processor using benchmark algorithms, which then decides the set of system calibrations that are required to tune the system back to a nominal state thereby mitigating systematic drifts that directly affect gate fidelity.

It is to be understood that the term "algorithm" may generally refer to a circuit of quantum gates either run singularly or as part of a collection of circuits, as might be required to perform a quantum computation. Thus, there is a distinction between "algorithm" and "benchmark algorithms" with the former being circuits run for a computation application and the latter being circuits used for system probing and tuning, and the features of this disclosure applying to benchmark-driven tuning for all quantum computations requiring both a single circuit execution as well as computations that require several runs of multiple algorithm circuits (such as quantum chemistry computations, for example).

Solutions to the issues described above are explained in more detail in connection with FIGS. 1-8, with FIGS. 1-3 providing a background of QIP systems or quantum computers, and more specifically, of atomic-based QIP systems or quantum computers.

Figure 2:
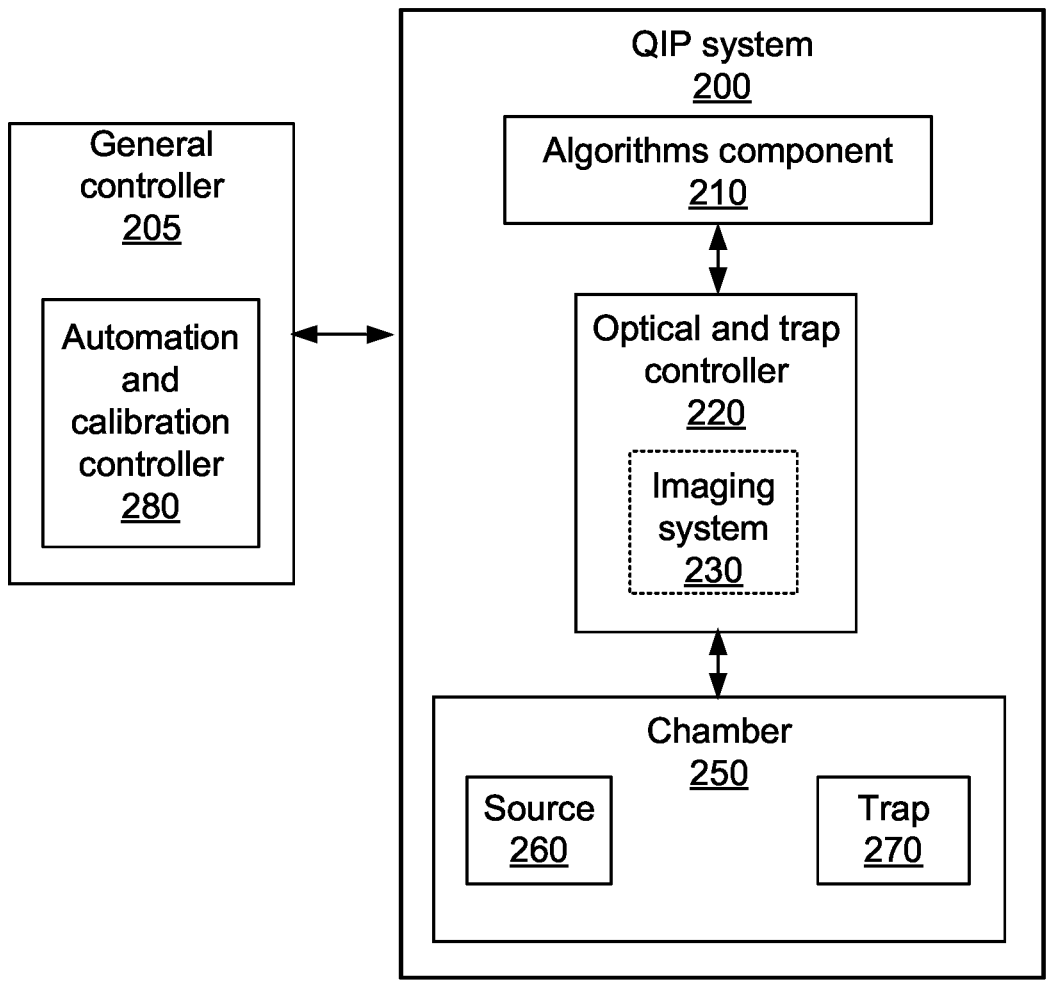
FIG. 2 illustrates an example of a quantum information processing (QIP) system in accordance with aspects of this disclosure.

FIG. 1 illustrates a diagram 100 with multiple atomic ions or ions 106 (e.g., ions 106a, 106b, . . . , 106c, and 106d) trapped in a linear crystal or chain 110 using a trap (not shown; the trap can be inside a vacuum chamber as shown in FIG. 2). The trap maybe referred to as an ion trap. The ion trap shown may be built or fabricated on a semiconductor substrate, a dielectric substrate, or a glass die or wafer (also referred to as a glass substrate). The ions 106 may be provided to the trap as atomic species for ionization and confinement into the chain 110. Some or all of the ions 106 may be configured to operate as qubits in a QIP system. Moreover, a quantum processor or quantum processing unit may indicate a portion of the quantum computer or QIP system that includes the chain 110 and uses the ions 106 in the chain 110 to perform quantum operations.

In the example shown in FIG. 1, the trap includes electrodes for trapping or confining multiple ions into the chain 110 laser-cooled to be nearly at rest. The number of ions trapped can be configurable and more or fewer ions may be trapped. The ions can be ytterbium ions (e.g., $^{171}Yb^+$ ions), for example. The ions are illuminated with laser (optical) radiation tuned to a resonance in $^{171}Yb^+$ and the fluorescence of the ions is imaged onto a camera or some other type of detection device (e.g., photomultiplier tube or PMT). In this example, ions may be separated by a few microns (µm) from each other, although the separation may vary based on architectural configuration. The separation of the ions is determined by a balance between the external confinement force and Coulomb repulsion and does not need to be uniform. Moreover, in addition to ytterbium ions, barium ions, neutral atoms, Rydberg atoms, or other types of atomic-based qubit technologies may also be used. Moreover, ions of the same species, ions of different species, and/or different isotopes of ions may be used. The trap may be a linear RF Paul trap, but other types of confinement devices may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

FIG. 2 illustrates a block diagram that shows an example of a QIP system 200. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations. The quantum and classical computations and operations may interact in such a hybrid system.

Shown in FIG. 2 is a general controller 205 configured to perform various control operations of the QIP system 200. These control operations may be performed by an operator, may be automated, or a combination of both. Instructions for at least some of the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200. These calibration, testing, and automation operations may involve, for example, all or part of an algorithms component 210, all or part of an optical and trap controller 220 and/or all or part of a chamber 250.

The QIP system 200 may include the algorithms component 210 mentioned above, which may operate with other parts of the QIP system 200 to perform or implement quantum algorithms, quantum applications, or quantum operations. The algorithms component 210 may be used to perform or implement a stack or sequence of combinations of single qubit operations and/or multi-qubit operations (e.g., two-qubit operations) as well as extended quantum computations. The algorithms component 210 may also include software tools (e.g., compilers) that facility such performance or implementation. As such, the algorithms component 210 may provide, directly or indirectly, instructions to various components of the QIP system 200 (e.g., to the optical and trap controller 220) to enable the performance or implementation of the quantum algorithms, quantum applications, or quantum operations. The algorithms component 210 may receive information resulting from the performance or implementation of the quantum algorithms, quantum applications, or quantum operations and may process the information and/or transfer the information to another component of the QIP system 200 or to another device (e.g., an external device connected to the QIP system 200) for further processing.

The QIP system 200 may include the optical and trap controller 220 mentioned above, which controls various aspects of a trap 270 in the chamber 250, including the generation of signals to control the trap 270. The trap 270 may be associated with the quantum processor or quantum processing unit in the QIP system 200. The optical and trap controller 220 may also control the operation of lasers, optical systems, and optical components that are used to provide the optical beams that interact with the atoms or ions in the trap. Optical systems that include multiple components may be referred to as optical assemblies. The optical beams are used to set up the ions, to perform or implement quantum algorithms, quantum applications, or quantum operations with the ions, and to read results from the ions. Control of the operations of laser, optical systems, and optical components may include dynamically changing operational parameters and/or configurations, including controlling positioning using motorized mounts or holders. When used to confine or trap ions, the trap 270 may be referred to as an ion trap. The trap 270, however, may also be used to trap neutral atoms, Rydberg atoms, and other types of atomic-based qubits. The lasers, optical systems, and optical components can be at least partially located in the optical and trap controller 220, an imaging system 230, and/or in the chamber 250.

The QIP system 200 may include the imaging system 230. The imaging system 230 may include a high-resolution imager (e.g., CCD camera) or other type of detection device (e.g., PMT) for monitoring the ions while they are being provided to the trap 270 and/or after they have been provided to the trap 270 (e.g., to read results). In an aspect, the imaging system 230 can be implemented separate from the optical and trap controller 220, however, the use of fluorescence to detect, identify, and label ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of what may be referred to as a processor or processing portion of the QIP system 200. That is, the trap 270 may be considered at the core of the processing operations of the QIP system 200 since it holds the atomic-based qubits that are used to perform or implement the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Aspects of this disclosure may be implemented at least partially using the general controller 205 and/or the automation and calibration controller 280. The general controller 205 and/or the automation and calibration controller 280 may control and/or instruct portions of the QIP system 200 to perform certain functions associated with the benchmark-driven automation techniques described herein for tuning or calibrating QIP systems using an active stabilization approach. For example, the general controller 205 and/or the automation and calibration controller 280 may control and/or instruct the algorithms component 210, the optical and trap controller 220 and its sub-components, and/or the chamber 250 and its sub-components.

Figure 3:
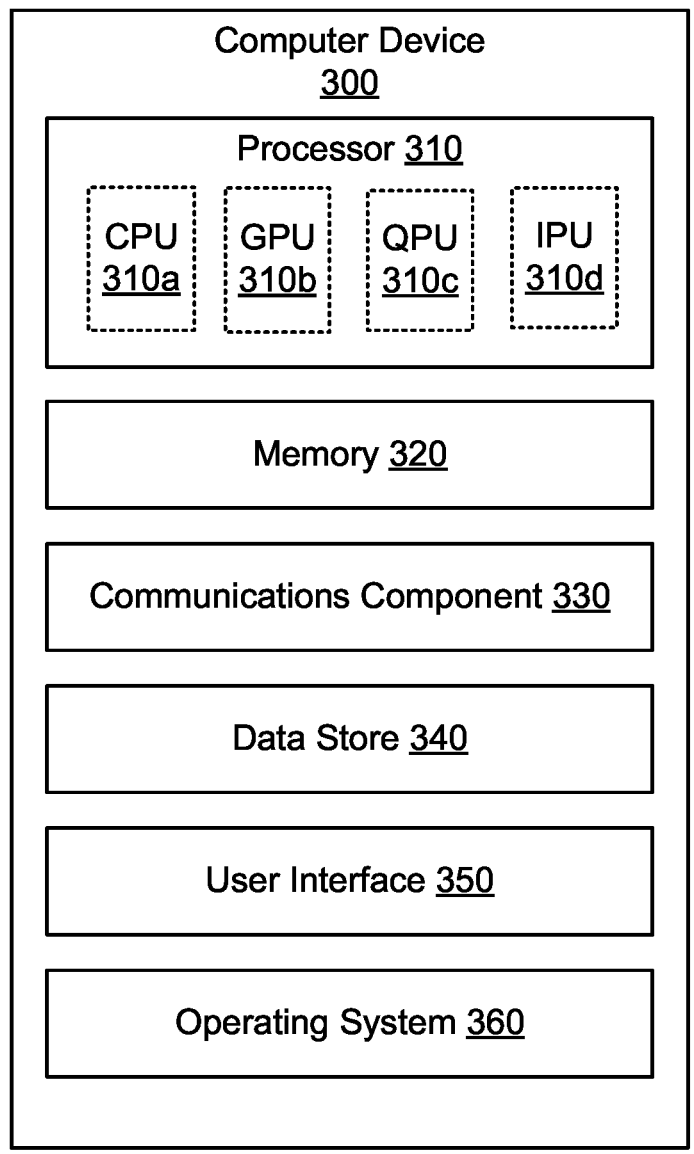
FIG. 3 illustrates an example of a computer device in accordance with aspects of this disclosure.

Referring now to FIG. 3, an example of a computer system or device 300 is shown. The computer device 300 may represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single processor, multiple set of processors, or one or more multi-core processors. Moreover, the processor 310 may be implemented as an integrated processing system and/or a distributed processing system. The processor 310 may include one or more central processing units (CPUs) 310$a$, one or more graphics processing units (GPUs) 310$b$, one or more quantum processing units (QPUs) 310$c$, one or more intelligence processing units (IPUs) 310$d$ (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300). Quantum operations may be performed by the QPUs 310$c$. Some or all of the QPUs 310$c$ may use atomic-based qubits, however, it is possible that different QPUs are based on different qubit technologies.

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

The processor 310 and/or the QPU 310c may control and/or instruct portions of the computer device 300 to perform certain functions associated with the benchmark-driven automation techniques described herein for tuning or calibrating quantum computers using an active stabilization approach.

In connection with the systems described in FIGS. 1-3, the concept of tuning-benchmarks or benchmarks is introduced below. Benchmark algorithms are comprised of single qubit and two-qubit quantum gates. One can design a suite of such benchmarks, each tailored to measure the drift of a specific component of a system, henceforth referred to as an observable while having minimal crosstalk with any other system observable. A system observable may refer to a specific measurable system property, one that is distinctly treated and measured from other system properties. A drift may refer to a change in value from a nominal range that is suitable for high fidelity operations. This allows decoupling measurement and calibration of each observable drift to avoid errors from cross-coupling.

The term calibration may be used to describe a technique that allows one to actively stabilize each observable of a system. Each calibration runs an experiment on the quantum computer to measure the relationship between a system observable and its control parameter, thereby allowing one to set an appropriate value of the control parameter to actively stabilize the corresponding system observable. For example, for aligning laser beams that drive a quantum gate on a qubit, one can measure a system observable: namely the qubit transition probability as a function of the position of a mechanical motor that moves the laser position, which in this case is a control parameter. By performing this measurement/scan one can analyze the observable (i.e., the transition probability) to find the appropriate control parameter (i.e., the motor position) to be set to align the laser beam position to an atomic-based qubit.

Figure 4:
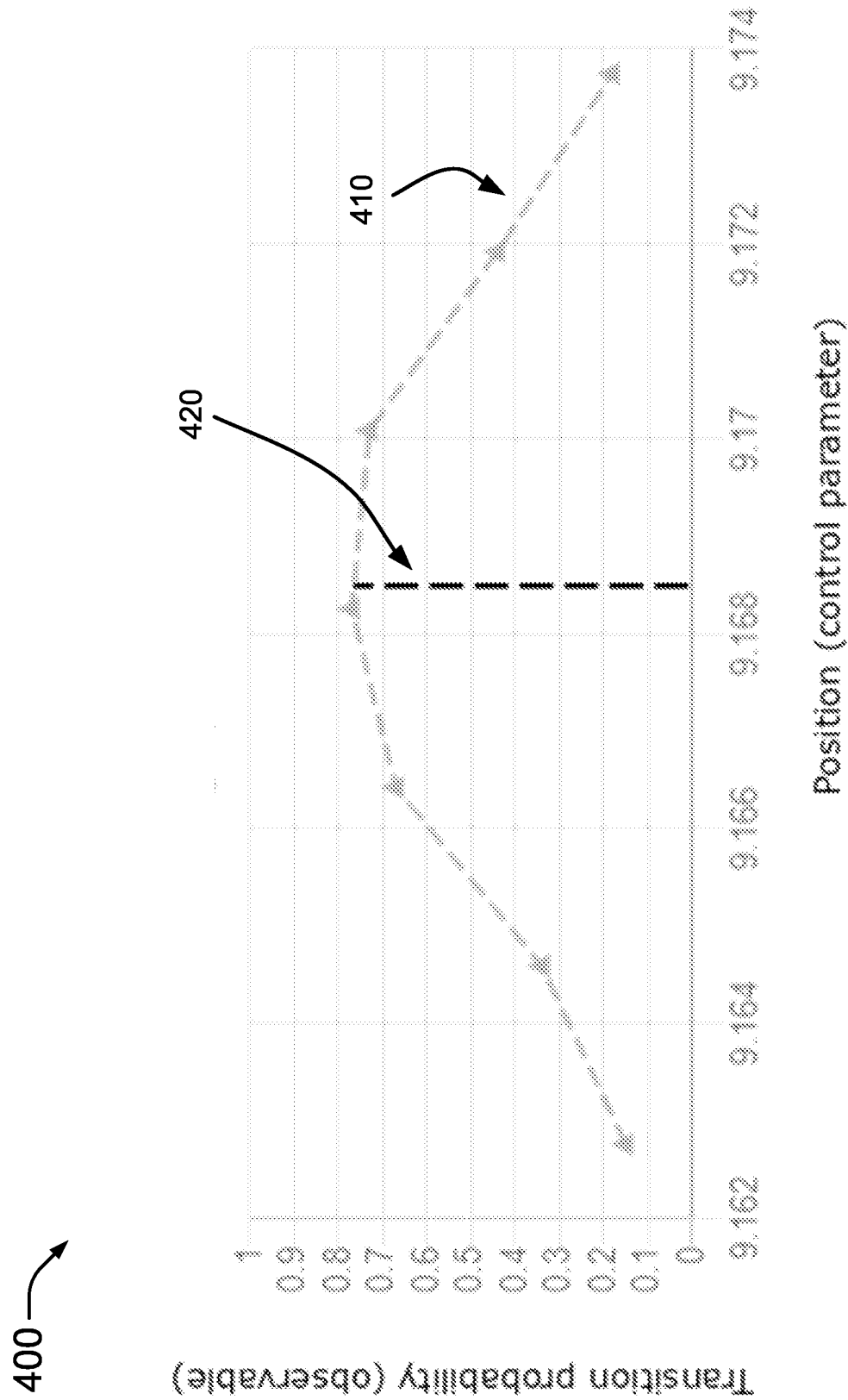
FIG. 4 illustrates an example of a calibration of laser position based on a system observable in accordance with aspects of this disclosure.

FIG. 4 shows a diagram 400 that illustrates such an example of a calibration of a quantum computer system observable in which a laser position is calibrated based on a system observable such as the transition probability of a qubit state 410. The dashed vertical line 420 suggests a calibrated value of the control parameter where the observable is maximized. That is, in this example, the motor position that results in the maximum transition probability is the appropriate value of the control parameter. The diagram 400 is merely intended to provide an example of the calibration of a single system observable, however, there may be a large number of system observables that may be tracked for a particular quantum computer and calibrated for by tuning their corresponding control parameter.

Typically, a calibration or calibration routine can be very time consuming, due to which it is impractical to perform repeated calibrations for all drifting system observables since that might severely limit the algorithm runtime of a quantum computer. In contrast, a tuning-benchmark (e.g., a benchmark associated with a particular system observable or a particular set of system observables) is relatively faster to run and therefore can be used to periodically check each type of system observables that need stabilization. In this disclosure, a decision path may be implemented and performed (e.g., in automation software or automation routines) in which a calibration is performed based on the outcome of a tuning-benchmark. This avoids executing unnecessary calibrations and thereby speeds up the tuning process which actively stabilizes the quantum computer.

A tuning-benchmark may fail to pass a threshold criterion (or multiple threshold criteria), thereby indicating that certain system observables need calibration. The failure can happen in more than one way, where each outcome may then invoke subsequent benchmarks and calibrations, for example.

Figure 5:
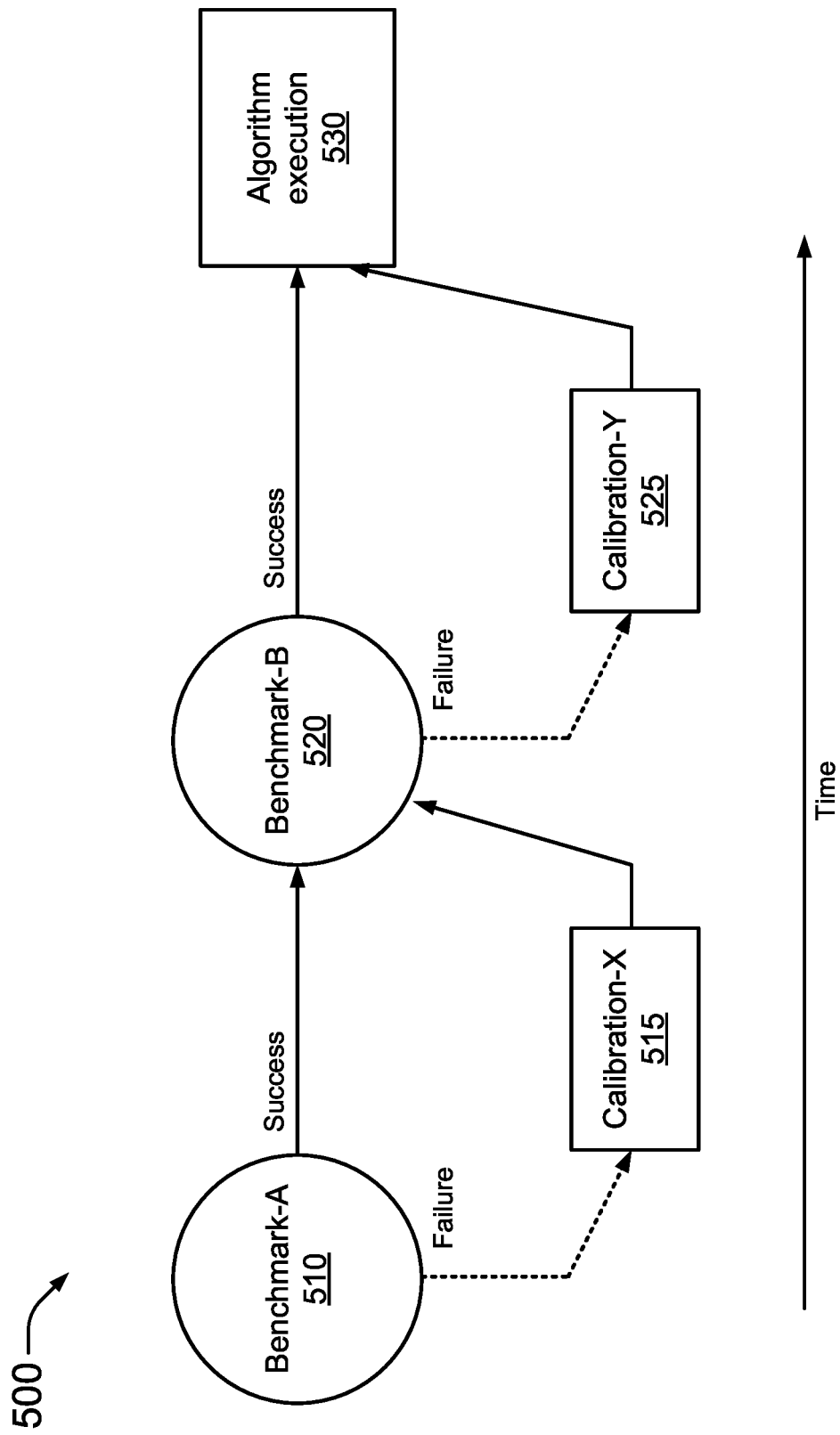
FIG. 5 illustrates an example of a tuning routine in accordance with aspects of this disclosure.

FIG. 5 shows a diagram 500 that illustrates an example of a tuning routine in which Benchmark-A 510 and Benchmark-B 520 are run to trigger Calibration-X 515 and Calibration-Y 525, respectively, when they fail to satisfy a certain criterion (e.g., when the benchmark is not successful). This constitutes the tuning routine which is performed before each algorithm execution 530. Although only two benchmarks (510, 520) and respective calibrations (515, 525) are shown prior to the algorithm execution 530, the number of benchmarks and respective calibrations need not be so limited.

Certain system drifts may cause more than one tuning benchmark to fail, in which case, the benchmarks may be coupled in the sense that one may fail if the other one fails. To circumvent the problem of cross-coupling of calibrations triggered by coupled benchmarks, such benchmarks may be executed in decreasing order of sensitivity and/or in decreasing order in the number of observables whose drift can cause that benchmark to fail (see e.g., a diagram 600 in FIG. 6A described below). For example, if failure of a Benchmark-A indicates that observable X and/or observable Y have drifted, and if failure of a Benchmark-B only indicates that observable Y has drifted, then one would perform Benchmark-A followed by Benchmark-B. This ensures that a wide range of drifts are captured by the first benchmark, which on failing, one could progressively investigate a smaller subset of drifts using subsequent coupled benchmarks. This increases efficiency of tuning by avoiding subsequent benchmarks from running when a more-sensitive benchmark (that is sensitive to a larger number of observable drifts) passes.

When there are several benchmarks that are each affected by a set of drifting observables and the sets are non-overlapping, these benchmarks are said to be uncoupled (see e.g., a diagram 650 in FIG. 6B described below). It is possible to sequentially run uncoupled benchmarks in any order as opposed to running them in logical order as would be necessary for coupled benchmarks. When the granularity of a benchmark is not sufficient to decouple the effects of more than one observable, all the observables are calibrated when that benchmark fails (see e.g., a diagram 675 in FIG. 6C described below).

Figure 6A:
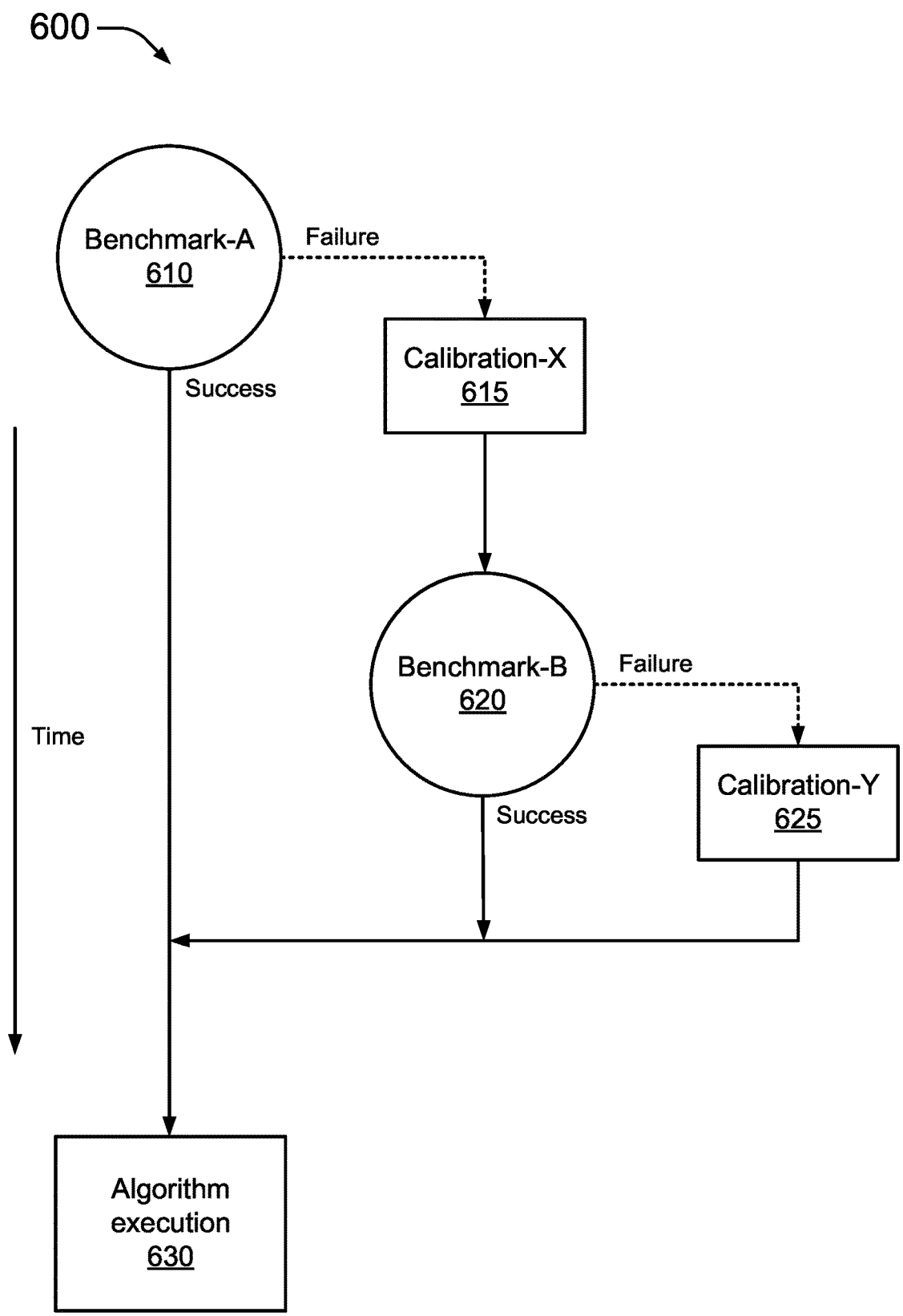
FIG. 6A illustrates an example of coupled benchmarks executed in order of decreasing sensitivity in accordance with aspects of this disclosure.
Figure 6B:
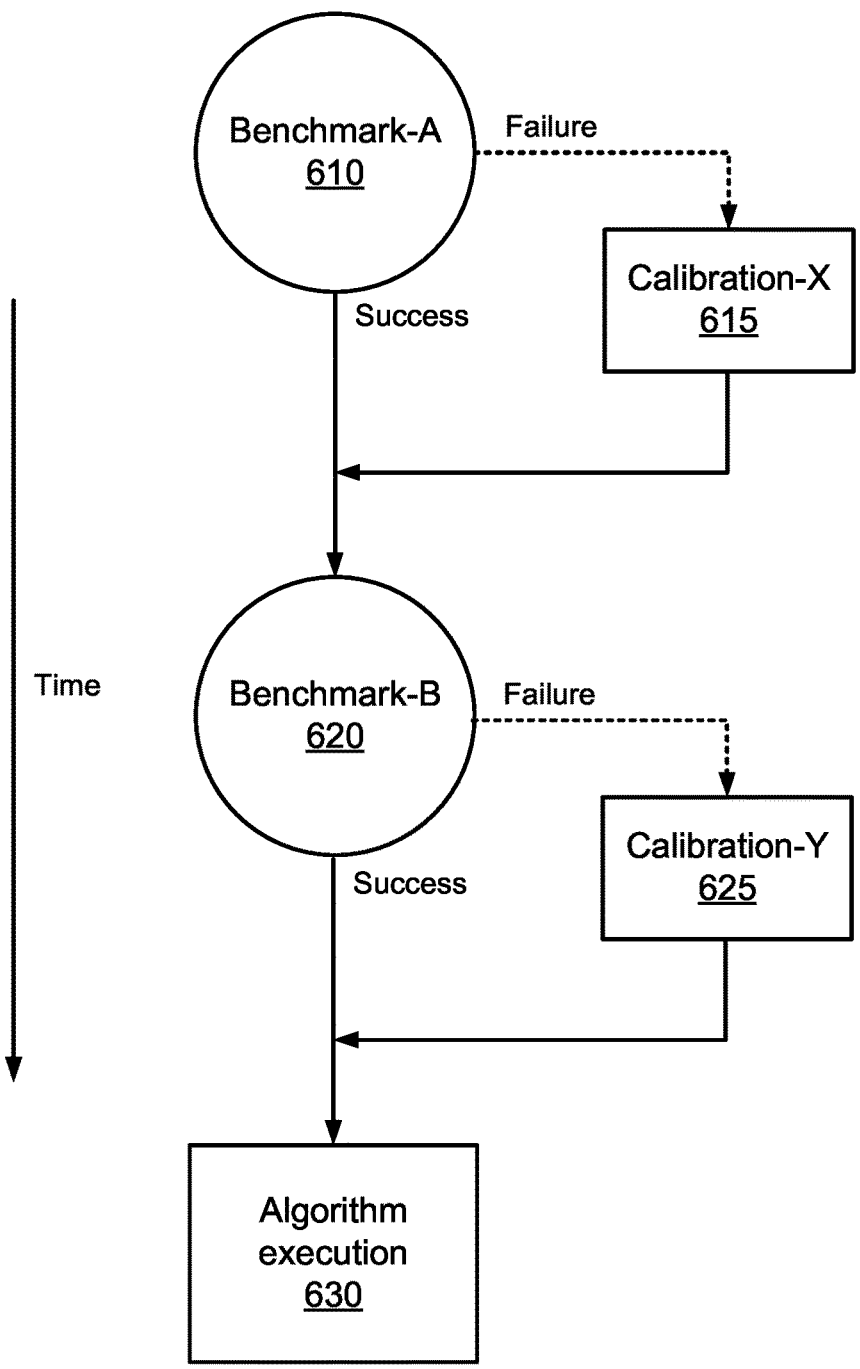
FIG. 6B illustrates an example of uncoupled benchmarks where they are sequentially executed followed by the respective calibration of each in accordance with aspects of this disclosure.
Figure 6C:
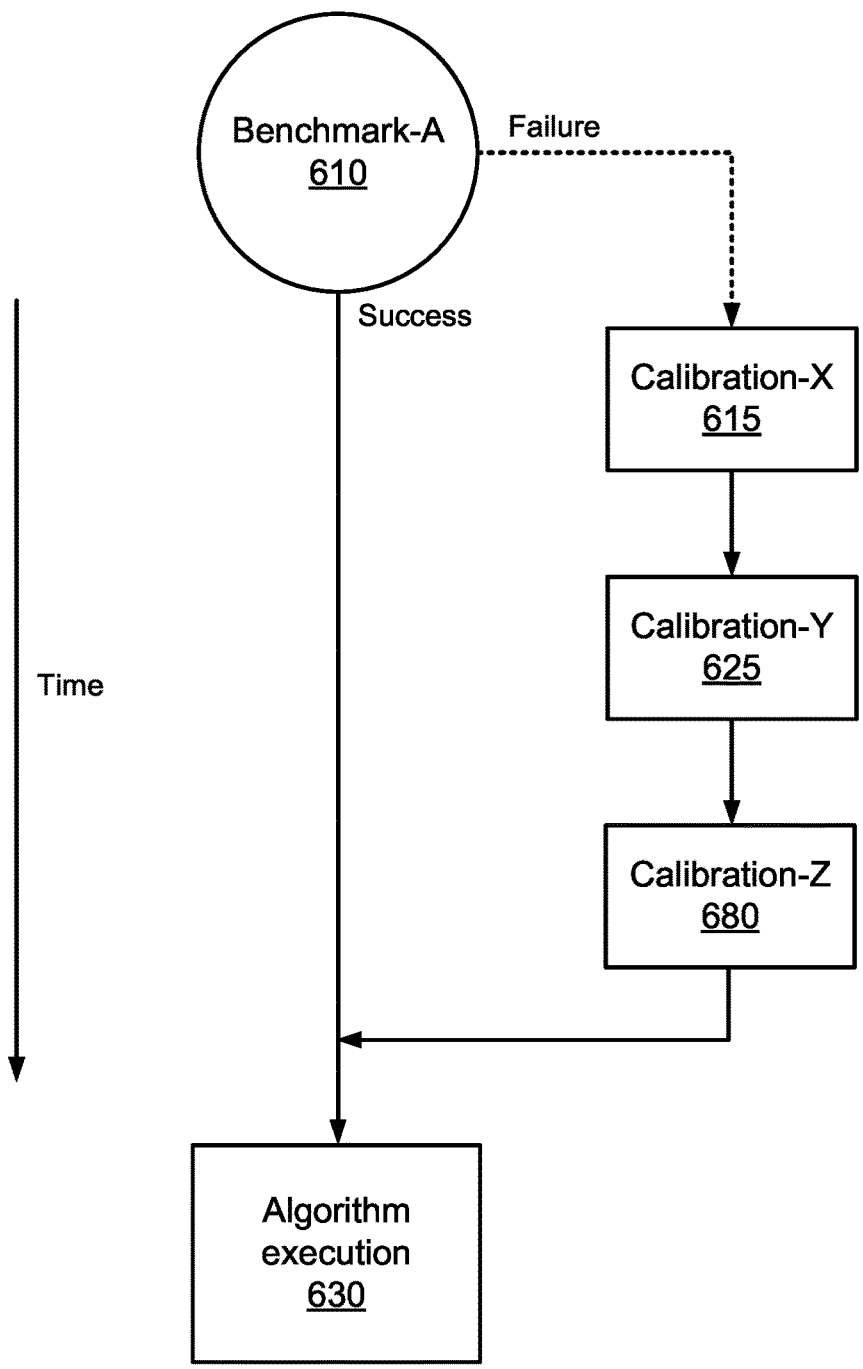
FIG. 6C illustrates an example of a case where failure of a benchmark indicates drifts in observables in accordance with aspects of this disclosure.

FIGS. 6A, 6B, and 6C are described below and provide examples of logical routines inside a decision tree in connection with the techniques for using tuning benchmarks described herein. The diagram 600 in FIG. 6A illustrates an example of coupled benchmarks executed in order of decreasing sensitivity. Failure of Benchmark-A 610 indicates drifting observables X and Y, whereas failure of Benchmark-B 620 indicates a drift in only observable Y. When Benchmark-A 610 fails, a Calibration-X 615 is performed. With observable X calibrated, then the Benchmark-B 620 is performed to see if observable Y needs calibration. If not, then the process proceeds to an algorithm execution 630, otherwise, Calibration-Y 625 is performed to calibrate observable Y.

Therefore, the ordering of benchmarks and calibrations is made such that each calibration is preceded by a benchmark and is only performed if all coupled benchmarks before it fail successively. This improves the efficiency of the decision tree.

FIG. 6B shows the diagram 650 that illustrates an example of uncoupled benchmarks where the benchmarks (610, 620) are sequentially executed followed by the respective calibration (615, 625) for each before process proceeds to the algorithm execution 630. For example, Benchmark-B 620 only takes places (e.g., it is run or executed) if Benchmark-A 610 is successful or after Calibration-X 615 is performed if Benchmark-A 610 is unsuccessful or fails. Similarly, the algorithm execution 630 only takes places (e.g., it is run or executed) if Benchmark-B 620 is successful or after Calibration-Y 625 is performed if Benchmark-B 620 is unsuccessful or fails.

FIG. 6C shows a diagram 675 that illustrates an example of a case where failure of Benchmark-A 610 may indicate drifts in observables X, Y, and/or Z. Due to the absence of a coupled benchmark that might indicate drifts in a smaller subset of observables, calibrations for X, Y and Z are all performed sequentially. In this example, Calibration-X 615 is performed first followed by Calibration-Y 625, which in turn is followed by a calibration for observable Z, that is, Calibration-Z 680. The algorithm execution 630 is performed in Benchmark-A 610 is successful or all three calibrations (615, 625, and 680) are completed.

The execution time of any benchmark depends on the number of quantum gates used and the number of experimental shots needed to measure the benchmark result. To make benchmarks run faster, one might decrease the number of shots. However, reducing the number of shots increases the statistical error of the benchmark outcome, which can increase the chances of it resulting in a (false) failure, which then triggers subsequent benchmarks and calibrations to be run. Therefore, decreasing the number of shots can eventually lead to an overall lengthier tuning routine. On the other hand, increasing the number of experimental shots improves the precision of the measurement reducing the odds of a false-positive of a benchmark failing. However, when running benchmarks on multiple qubits and gates, the increase in shots per benchmark can substantially increase the time taken to run them, which also dramatically slows down the tuning procedure.

To improve efficiency of tuning, a repeated benchmarking process (see e.g., a diagram 700 in FIG. 7 described below) is proposed where benchmarks are executed for a gate set of interest with a relatively low but reasonable number of experimental shots. When benchmarks fail on a subset of gates, the benchmark is repeated again but only for the failed subset. One can then combine the measurement statistics for the collective benchmarks run over the repetitions to increase the precision of the measurement. The gates that pass with the updated measurement can be removed from the list of failed benchmarks and we can then proceed on repeating the benchmarks on the residual gates. A limit may be set to the maximum number of such repetition. If the set of failed gates is empty before or at the repetition limit one can declare success. If a gate set persists to fail after the maximum number of repetitions has been met, then one can proceed to calibrate for those gates only.

This technique of benchmark repetition provides one or more of the following benefits. First, it allows the removal of statistical measurement errors by increasing precision on failed gates. Second, it increases efficiency of running benchmarks by selectively increasing experimental shots only on the failed gates which is a smaller subset of the gates required for running algorithms. Moreover, it suppresses any "false failure" outcome that might be triggered by a momentary fluctuation in the system which is not a systematic drift.

Figure 7:
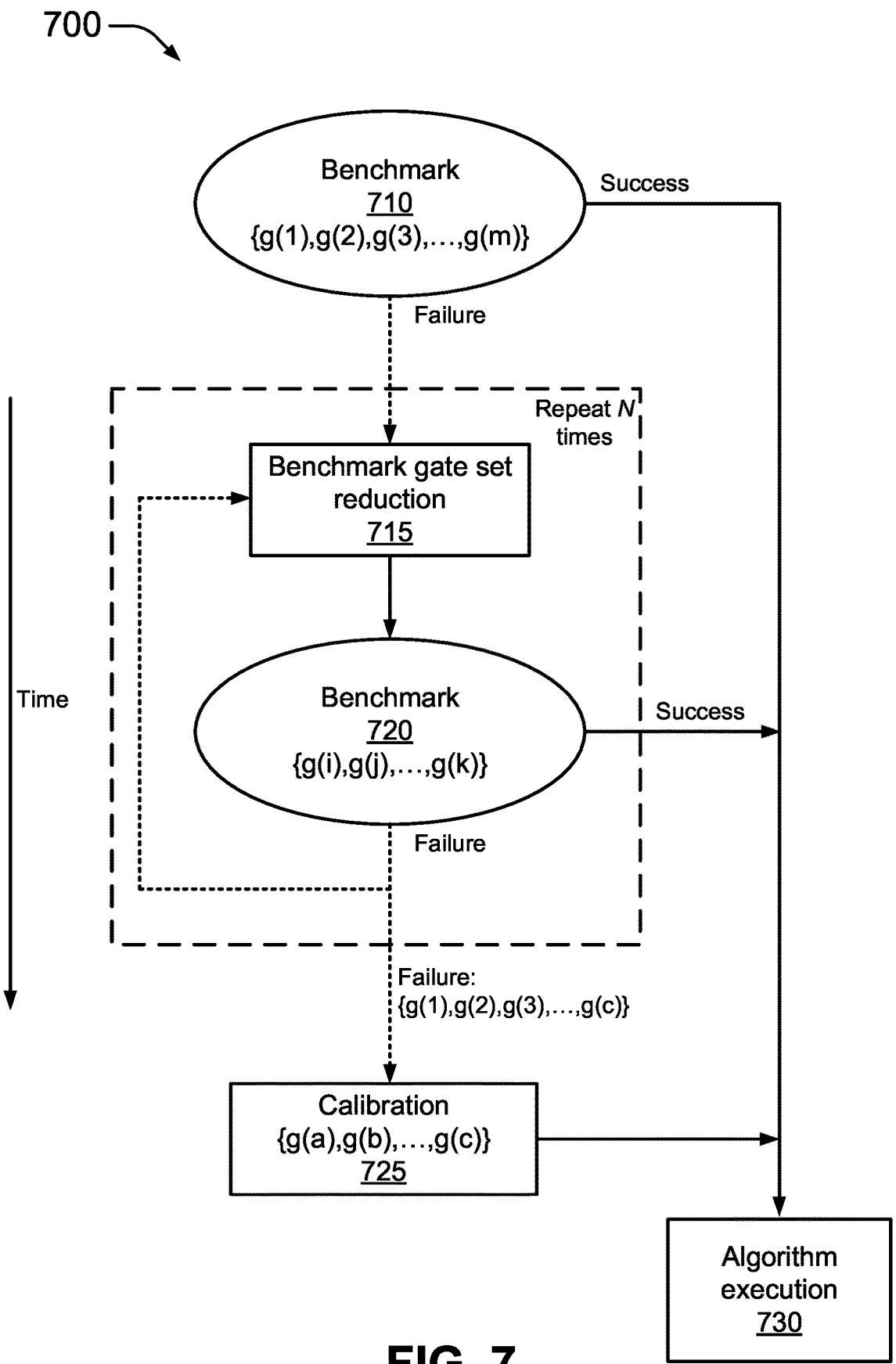
FIG. 7 illustrates an example of a benchmark noise reduction technique in accordance with aspects of this disclosure.

FIG. 7 shows a diagram 700 that illustrates an example of a benchmark noise reduction technique that uses a repetition process such as the one described above to enable the use of a relatively low but reasonable number of experimental shots and thereby maintain the execution time as short as possible while still providing reliable results.

In the example provided in the diagram 700, benchmarks are run on a set of m gates, which are required to run algorithms. This set is denoted by: $\{g(1), g(2), \ldots, g(m)\}$ and are part of the Benchmark 710. When a Benchmark 710 based on {g(1),g(2), . . . , g(m)} is successful, the process proceeds directly to an algorithm execution 730. When Benchmark 710 fails or is unsuccessful, the process proceeds to a benchmark gate set reduction 715 where the gate set {g(1),g(2), . . . , g(m)} is reduced to include only a subset of gates. In this example, the reduced gate set or subset of gates is identified as {g(i),g(j), . . . , g(k)}.

A new benchmark is performed on the reduced gate set or subset of gates. In this example, when a Benchmark 720 based on {g(i),g(j), . . . , g(k)} is successful, the process proceeds directly to the algorithm execution 730. When Benchmark 720 fails, the process returns to the benchmark gate set reduction 715 and the gate set is reduced further, that is, a new reduced gate set is identified that corresponds to a subset of gates of {g(i),g(j), . . . , g(k)}.

This process of iterating benchmarks (e.g., Benchmark 720) followed by gate set reduction (e.g., the benchmark gate set reduction 715) is repeated at most N times. If the benchmarks return success at any point the system proceeds to the execute algorithms (e.g., the algorithm execution 730). However, if failure on a residual gate set {g(a), g(b), . . . , g(c)} persists, only those gates are calibrated in a calibration 725 before proceeding to algorithm execution. This process increases the efficiency of the tuning of quantum gates for algorithms by reducing noise in benchmark measurements of these gates thereby limiting calibrations to gate sets that are genuinely miscalibrated.

Figure 8:
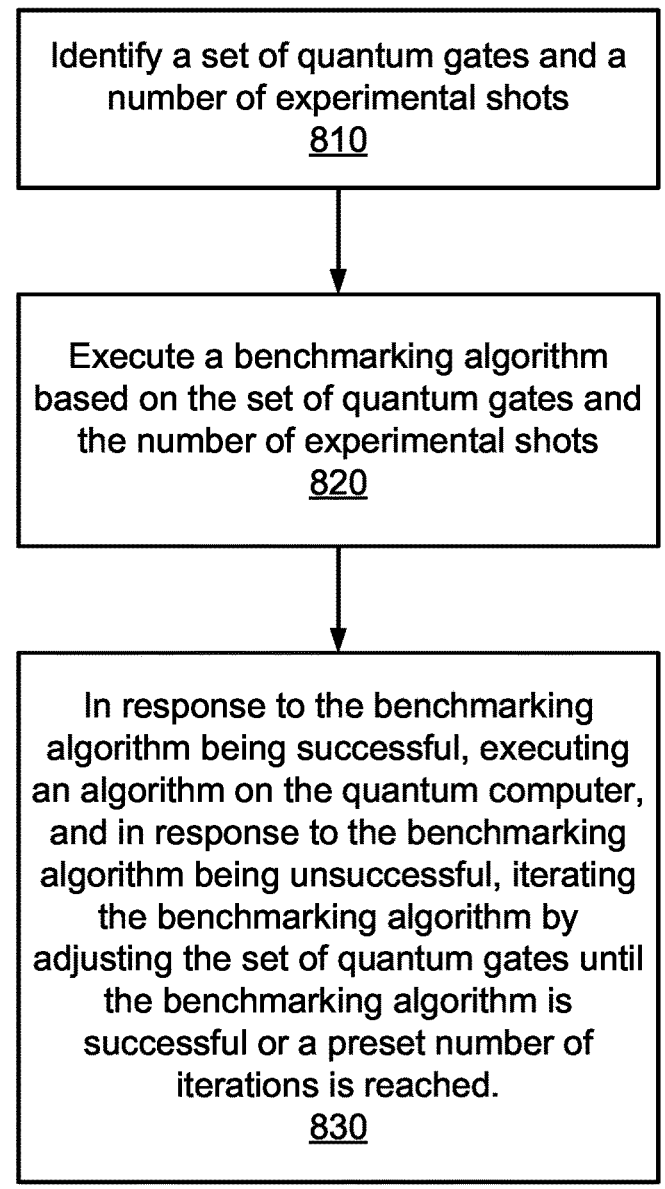
FIG. 8 illustrates a method for tuning a quantum computer in accordance with aspects of this disclosure.

FIG. 8 shows a method 800 for tuning a quantum computer in accordance with aspects of this disclosure. The method 800 includes, at 810, identifying a set of quantum gates and a number of experimental shots to perform a benchmark algorithm for active stabilization of one or more observables of the set of quantum gates.

At 820, the method 800 includes executing the benchmarking algorithm based on the set of quantum gates and the number of experimental shots.

At 830, the method 800 includes, in response to the benchmarking algorithm being successful, executing an algorithm on the quantum computer, and in response to the benchmarking algorithm being unsuccessful, iterating the benchmarking algorithm by adjusting the set of quantum gates until the benchmarking algorithm is successful or a preset number of iterations is reached.

In another aspect of the method 800, the benchmarking algorithm performs one or more measurements for the one or more observables to find that corresponding control parameters are appropriate and within a specified range.

In another aspect of the method 800, a calibration operation is performed in response to failure of a benchmarking algorithm to set the control parameters to appropriate value.

In another aspect of the method 800, the set of quantum gates includes single-qubit gates, two-qubit gates, or a combination thereof.

In another aspect of the method 800, the benchmarking algorithm is coupled to another benchmarking algorithm due to their sensitivity to common control parameters and the two benchmark algorithms are executed in order of decreasing sensitivity to the control parameters, thereby allowing calibrating each control parameter as required.

In another aspect of the method 800, the benchmarking algorithm is uncoupled from another benchmarking algorithm as they are not both sensitive to any of the control parameters and the two benchmark algorithms are executed sequentially.

In another aspect of the method 800, adjusting the set of quantum gates includes reducing a number of quantum gates in the set of quantum gates and executing the benchmarking algorithm based on the reduced set of quantum gates and the number of experimental shots. The reduced set of quantum gates includes the quantum gates from the set of quantum gates that failed the execution of the benchmarking algorithm.

In another aspect of the method 800, the set of quantum gates are the gates needed to execute the algorithm on the quantum computer.

In another aspect of the method 800, the method 800 further includes executing a calibration operation in response to reaching the preset number of iterations, wherein the calibration operation is performed on a last set of quantum gates resulting from iterating the benchmarking algorithm, and wherein the algorithm is executed on the quantum computer after completion of the calibration operation.

In another aspect of the method 800, the algorithm is a quantum computation algorithm.

The method 800 described above may be implemented in whole or in part in a system such as a quantum computer (e.g., the quantum computer 300) or a QIP system (e.g., the QIP system 300). For example, the system may include a trap (e.g., the trap 270) configured to hold multiple ions (e.g., the ions 106 in the chain 110) to implement quantum gates, a controller (e.g., the general controller 205, the automation and calibration controller 280), and an algorithms component (e.g., the algorithms component 210). The trap, the controller, and the algorithms component may all be part of a QPU such as the QPU 310c in FIG. 3, for example.

The controller may be configured to identify a set of quantum gates and a number of experimental shots to perform a benchmark algorithm for active stabilization of one or more observables of the set of quantum gates and execute the benchmarking algorithm based on the set of quantum gates and the number of experimental shots. Moreover, the algorithms component may be configured to, in response to the benchmarking algorithm being successful, execute an algorithm, and the controller may be further configured to, in response to the benchmarking algorithm being unsuccessful, iterate the benchmarking algorithm by adjusting the set of quantum gates until the benchmarking algorithm is successful or a preset number of iterations is reached.

In another aspect of the system, the benchmarking algorithm performs one or more measurements for the one or more observables to find that corresponding control parameters are appropriate and within a specified range.

In another aspect of the system, the set of quantum gates includes single-qubit gates, two-qubit gates, or a combination thereof.

In another aspect of the system, the benchmarking algorithm is coupled to another benchmarking algorithm due to their sensitivity to common control parameters and the two benchmark algorithms are executed by the controller in order of decreasing sensitivity to the control parameters, thereby allowing calibrating each control parameter as required.

In another aspect of the system, the benchmarking algorithm is uncoupled from another benchmarking algorithm as they are not both sensitive to any of the control parameters and the two benchmark algorithms are executed by the controller sequentially.

In another aspect of the system, the adjusting the set of quantum gates by the controller includes reducing a number of quantum gates in the set of quantum gates and executing the benchmarking algorithm based on the reduced set of quantum gates and the number of experimental shots. The reduced set of quantum gates includes the quantum gates from the set of quantum gates that failed the execution of the benchmarking algorithm.

In another aspect of the system, the set of quantum gates are the gates needed to execute the algorithm.

In another aspect of the system, the controller is further configured to execute a calibration operation in response to reaching the preset number of iterations, wherein the calibration operation is performed on a last set of quantum gates resulting from iterating the benchmarking algorithm, and wherein the algorithm is executed by the algorithms component after completion of the calibration operation.

In another aspect of the system, the algorithm is a quantum computation algorithm.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method for tuning a quantum computer that includes an ion trap for confining ions to implement quantum gates, comprising:
   identifying a set of quantum gates and a number of experimental shots to perform a benchmark algorithm for active stabilization of one or more observables of the set of quantum gates;
   executing the benchmarking algorithm based on the set of quantum gates and the number of experimental shots;
   in response to the benchmarking algorithm being successful, executing an algorithm on the quantum computer, and in response to the benchmarking algorithm being unsuccessful, iterating the benchmarking algorithm by adjusting the set of quantum gates until the benchmarking algorithm is successful or a preset number of iterations is reached;
   executing a calibration operation of a component in the quantum computer in response to reaching the preset number of iterations, wherein the calibration operation stabilizes at least one system observable of the quantum computer to configure at least a last set of quantum gates in the ion trap; and
   executing the algorithm after completion of the calibration operation is executed.

2. The method of claim 1, wherein the benchmarking algorithm performs one or more measurements for the one or more observables to find that corresponding control parameters are appropriate and within a specified range.

3. The method of claim 1, wherein a calibration operation is performed in response to failure of a benchmarking algorithm to set the control parameters to appropriate value.

4. The method of claim 1, wherein the benchmarking algorithm is coupled to another benchmarking algorithm due to respective sensitivities of the algorithms to common control parameters and the two benchmark algorithms are executed in order of decreasing sensitivity to the control parameters, thereby allowing calibrating each control parameter as required.

5. The method of claim 1, wherein the benchmarking algorithm is uncoupled from another benchmarking algorithm as they are not both sensitive to any of the control parameters and the two benchmark algorithms are executed sequentially.

6. The method of claim 1, wherein adjusting the set of quantum gates includes:
   reducing a number of quantum gates in the set of quantum gates; and
   executing the benchmarking algorithm based on the reduced set of quantum gates and the number of experimental shots.

7. The method of claim 6, wherein the reduced set of quantum gates includes the quantum gates from the set of quantum gates that failed the execution of the benchmarking algorithm.

8. The method of claim 1, wherein the set of quantum gates are the gates needed to execute the algorithm on the quantum computer.

9. The method of claim 1, wherein the algorithm is a quantum computation algorithm.

10. A quantum computer, comprising:
    a trap configured to hold multiple ions to implement quantum gates;
    an algorithms component; and
    a controller configured to:
      identify a set of quantum gates and a number of experimental shots to perform a benchmark algorithm for active stabilization of one or more observables of the set of quantum gates, and
      execute the benchmarking algorithm based on the set of quantum gates and the number of experimental shots, and
    wherein the algorithms component is configured to, in response to the benchmarking algorithm being successful, execute an algorithm, and the controller is configured to, in response to the benchmarking algorithm being unsuccessful, iterate the benchmarking algorithm by adjusting the set of quantum gates until the benchmarking algorithm is successful or a preset number of iterations is reached,
    wherein the controller is further configured to execute a calibration operation of a component in the quantum computer in response to reaching the preset number of iterations, the calibration operation stabilizing at least one system observable of the quantum computer to configure at least a last set of quantum gates in the trap, and
    wherein the algorithms component is configured to execute the algorithm after the calibration operation is executed.

11. The quantum computer of claim 10, wherein the benchmarking algorithm performs one or more measurements for the one or more observables to find that corresponding control parameters are appropriate and within a specified range.

12. The quantum computer of claim 10, wherein the set of quantum gates includes single-qubit gates, two-qubit gates, or a combination thereof.

13. The quantum computer of claim 10, wherein the benchmarking algorithm is coupled to another benchmarking algorithm due to respective sensitivities of the algorithms to common control parameters and the two benchmark algorithms are executed by the controller in order of decreasing sensitivity to the control parameters, thereby allowing calibrating each control parameter as required.

14. The quantum computer of claim 10, wherein the benchmarking algorithm is uncoupled from another benchmarking algorithm as they are not both sensitive to any of the control parameters and the two benchmark algorithms are executed by the controller sequentially.

15. The quantum computer of claim 10, wherein adjusting the set of quantum gates by the controller includes:
   reducing a number of quantum gates in the set of quantum gates; and
   executing the benchmarking algorithm based on the reduced set of quantum gates and the number of experimental shots.

16. The quantum computer of claim 15, wherein the reduced set of quantum gates includes the quantum gates from the set of quantum gates that failed the execution of the benchmarking algorithm.

17. The quantum computer of claim 10, wherein the set of quantum gates are the gates needed to execute the algorithm.

18. The quantum computer of claim 10, wherein the algorithm is a quantum computation algorithm.

\* \* \* \* \*